United States Patent
Maron et al.

[11] Patent Number: 5,829,845
[45] Date of Patent: Nov. 3, 1998

[54] BRAKE SYSTEM FOR A MOTOR VEHICLE

[75] Inventors: Christof Maron, Gehrden; Hubertus Prinzler, Langenhagen; Thomas Dieckmann, Deutschland, all of Germany

[73] Assignee: Continental Aktiengesellschaft, Hanover, Germany

[21] Appl. No.: 785,057

[22] Filed: Jan. 17, 1997

[30] Foreign Application Priority Data

Jan. 20, 1996 [DE] Germany .......................... 196 01 983

[51] Int. Cl.[6] .............. F16D 55/26; B60T 13/74
[52] U.S. Cl. .................... 303/20; 188/72.1; 188/72.8; 188/106 P; 188/162; 188/158; 188/265
[58] Field of Search ................... 303/20, 115.2, 303/162, 89, 155, 14; 188/265, 171, 158, 72.1, 72.7, 72.8, 156, 162, 106 F, 106 P, 106 R, 106 A, 163, 161, 159, 173, 71.2

[56] References Cited

U.S. PATENT DOCUMENTS

| | | | |
|---|---|---|---|
| 4,567,967 | 2/1986 | Crossman | 188/72.8 |
| 4,658,939 | 4/1987 | Kircher et al. | |
| 4,809,824 | 3/1989 | Fargier et al. | |
| 5,090,518 | 2/1992 | Schenk et al. | 188/72.1 |
| 5,103,941 | 4/1992 | Vranish | |
| 5,107,967 | 4/1992 | Fujita et al. | 188/72.1 |
| 5,125,483 | 6/1992 | Kitagawa et al. | 188/72.1 |
| 5,148,896 | 9/1992 | Eddy, Jr. | 188/265 |
| 5,150,773 | 9/1992 | Hickey et al. | 188/162 |
| 5,582,275 | 12/1996 | Arnold | 188/161 |
| 5,682,965 | 11/1997 | Prinzler | 188/158 |

FOREIGN PATENT DOCUMENTS

| | | |
|---|---|---|
| 0520525 | 12/1992 | European Pat. Off. |
| 0275783 | 7/1988 | France |
| 3410006 | 9/1985 | Germany |

*Primary Examiner*—Douglas C. Butler
*Attorney, Agent, or Firm*—Greenblum & Bernstein, P.L.C.

[57] ABSTRACT

An electrical brake system for a motor vehicle is provided that may include an integrated electrical auxiliary brake. The wheel brakes of the brake system may be actuated via brake application devices. The internal friction can be selectively increased through an electrical auxiliary brake to create a self-locking of the brake application device with an increased brake application force.

18 Claims, 4 Drawing Sheets

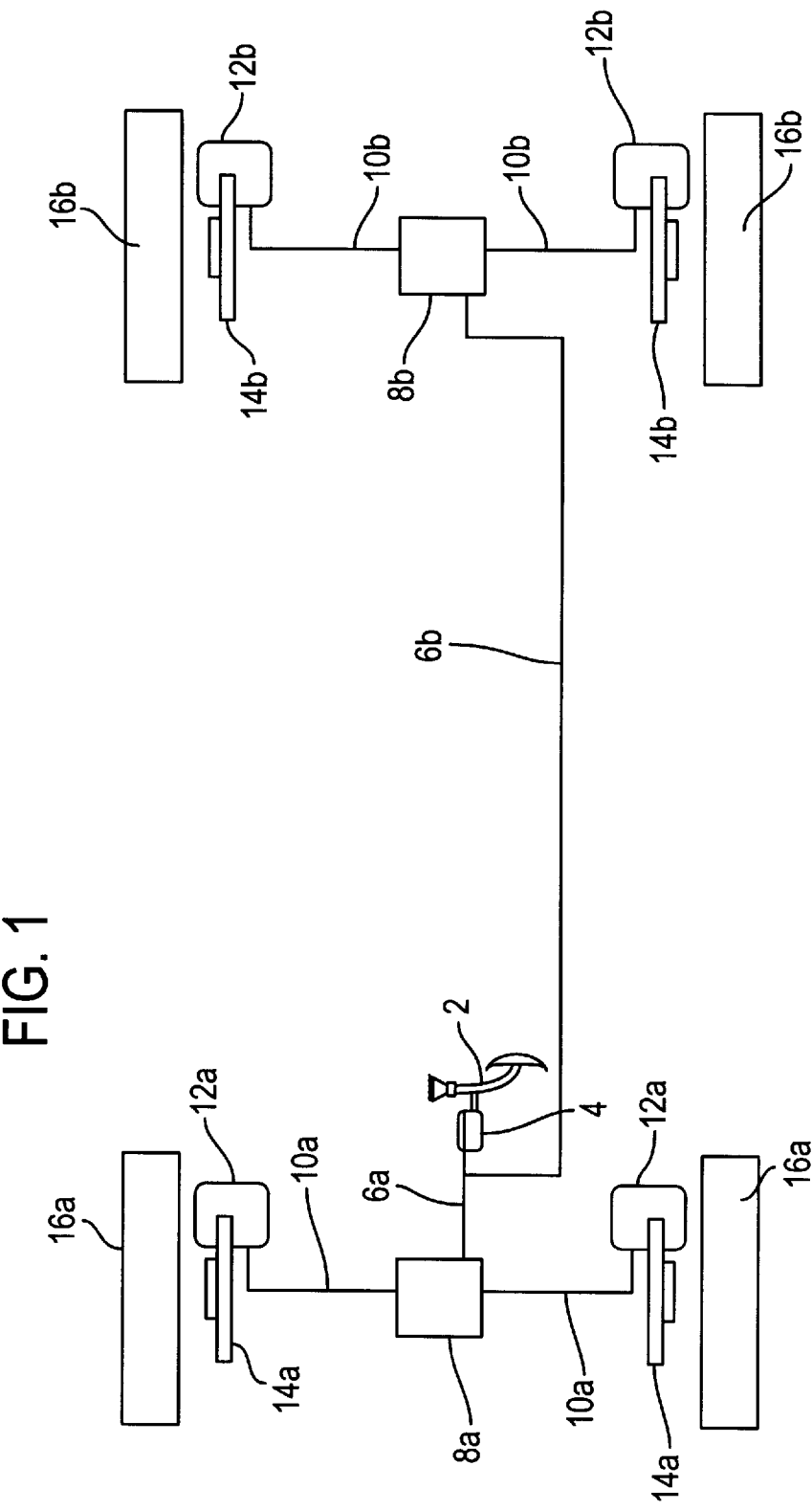

BRAKE SYSTEM FOR A MOTOR VEHICLE

CROSS-REFERENCE TO RELATED APPLICATIONS

The present invention claims the priority under 35 U.S.C. § 119 of German Patent Application No. 196 01 983.4, filed on Jan. 20, 1996, the disclosure of which is expressly incorporated by reference herein in its entirety.

BACKGROUND OF THE INVENTION

1. Field of the Invention

The present invention may be directed to an electrical brake system for a motor vehicle, e.g., a passenger vehicle, that may include a brake pedal generating an electrical brake signal as a function of foot pressure; a wheel brake, for each wheel of the vehicle, associated with an electromotor having a brake application device applying an application force on a respective wheel brake. The application force may correspond to the electrical brake signal that generates a braking force at the wheel, and an auxiliary braking function for at least one wheel of the motor vehicle.

The present invention may also relate to a process for locking an electrical brake system.

2. Discussion of Background Information

Electrical brake systems similar in general to those mentioned above have been disclosed, for example, in German Patent Document 34 10 006, which proposes a brake system for a motor vehicle with an electrical brake system for all wheels. If foot pressure is exerted on a brake pedal by the driver of a vehicle, then the amount of braking, demonstrated by the foot pressure, is converted into a corresponding electrical signal by a brake signal transmitter. Electromotors associated with each wheel brake are actuated in accordance with the electrical signal. Each electromotor in turn sets a piston into an axial motion which, as a result of the movement, presses the brake shoe against the brake disk to generate braking force at the wheel. In addition to the first electrical brake system, the brake system disclosed by German Patent Document 34 10 006 includes a second brake system, e.g., for mechanically transmitting a braking force to the wheels of at least one vehicle axle via a common brake pedal. The second brake system is independent of the electrical brake system and launches into full action when there is a malfunction or a failure of the electrical brake system so as to safely brake the vehicle in this instance. The second brake system is realized with cables and can also assume an auxiliary braking function in a known manner by virtue of the fact that it is locked in a particular position with an engagable lever.

The brake system disclosed by German Patent Document 34 10 006 is described as safe because the electrical brake system is independent of the mechanical brake system. In particular, the auxiliary braking function cannot negatively influence the safety of the electrical brake system since the auxiliary braking function is undertaken by the mechanical brake system. Mechanical brake systems, through, require a high maintenance expenditure. Furthermore, the mechanical brake system requires additional weight, which runs counter to the goal of weight reduction in modern vehicle design.

SUMMARY OF THE INVENTION

An object of the present invention is to integrate the auxiliary braking feature into the electrical brake system so that a separate, e.g., mechanical, brake system can be eliminated. According to the present invention, the integration of the auxiliary braking feature should not impair the safety of the electrical brake system. A further object of the present invention is to provide a process for locking an electrical brake system.

Accordingly, the present invention may be directed to an electrical braking system for a vehicle. The electrical braking system may include an auxiliary braking feature performed by an electrical auxiliary brake that permits uninterrupted movement of a brake application device in a first current-carrying state and leads to a self-locking of the brake application device through a friction increase in a second non-current-carrying state so that the brake application device can be locked with a predetermined brake application force. A friction force produced by the friction increase can be overcome by an electromotor.

The present invention may also be directed to a method for locking an electrical brake system. The method may include applying a braking force on at least one wheel of the vehicle by generating a defined brake application force at the corresponding wheel brake. During application of the braking force, an electrical auxiliary brake associated with the at least one wheel may be positioned in the first, current-carrying state.

The process may also include transferring the electrical auxiliary brake into a second, currentless state to exert increased friction on the brake application device until the electrical auxiliary brake is returned to the first, current-carrying state by means of which the brake application force generated in the process noted above is essentially maintained and the wheel is locked.

According to the present invention, using the electrical auxiliary brake an internal friction in the wheel brake may be intentionally increased so that a self-locking of the wheel brake occurs with a brake application force that is sufficient to lock the wheel.

The advantages of the present invention include, e.g., the auxiliary braking function may be fully integrated into the electrical brake system so that the electrical brake system, including the auxiliary brake, may be substantially maintenance free. The safety of the electrical brake system is not impaired or compromised since the friction force generated by the electrical auxiliary brake can be overcome by an electromotor. Consequently, movement of the brake application device may be possible even when the auxiliary brake is "set", e.g., during a functional failure. A further advantage of the present invention may be, e.g., that each wheel of the motor vehicle can be attached to the electrical brake system with only a slight cost of installation. Furthermore, the electrical auxiliary brake may include an electrical interface to the brake system so that locking no longer necessitates driver execution but can be initiated by electrically controlled, higher order systems. For example, it is possible to connect the auxiliary braking function with an anti-theft device in such a way that a "release" of the auxiliary brake automatically occurs only after a correct code has been previously entered into a device provided for this.

In accordance with another feature of the present invention, the electrical auxiliary brake may be embodied as an electromagnetic friction slip coupling which has a particularly simple design and may be inexpensive to produce.

In accordance with yet another feature of the present invention, the wheel brakes of the front axle may have an electrical auxiliary brake. This may be particularly advantageous because there is usually a high axle load on the front axle and, thus, a favorable locking of the front wheels can be achieved. Furthermore, there is usually more space for the installation of the electromotors at the front axle so that these motors can be embodied as larger and, preferably, more powerful. This feature results in enhanced emergency braking properties during a failure of the auxiliary brake.

In accordance with yet another feature of the present invention, each of the wheels of the rear axle may include an electrical auxiliary brake so that all four wheels of the vehicle can be locked and consequently a particularly effective auxiliary braking of the vehicle is achieved.

In accordance with still another feature of the present invention, the process may also include applying, through the actuation of the brake pedal, a braking force on the vehicle wheel to be locked. Furthermore, the electrical auxiliary brake may be automatically transferred into the second, currentless state when the vehicle motor is switched off.

In accordance with yet another feature of the present invention, the brake application device may remain locked after returning the electrical auxiliary brake to the current carrying state.

In accordance with a further feature of the present invention, the process may also include overcoming the locking of the at least one wheel by actuating the electromotor.

The present invention may also be directed to a braking system for a vehicle including a brake pedal and pressure sensor that monitors braking pressure applied to the brake pedal. The braking system may include a wheel brake associated with each of a plurality of wheels of the vehicle, an electromotor associated with each wheel brake applying a brake application force corresponding to the applied braking pressure, and an auxiliary braking device associated with at least one wheel brake comprising a first and second state, the first state enabling uninterrupted actuation of the at least one wheel brake and the second state, enabled after the first state, increasing friction within the at least one wheel brake to lock the at least one wheel brake.

In accordance with a further feature of the present invention, the braking system may further include a driver that drives the electromotor to overcome the locking of the at least one wheel brake by the auxiliary braking device.

In accordance with a still further feature of the present invention, the auxiliary braking device may exhibit a mechanical hysteresis with respect to the brake application force and rotation of the electromotor.

In accordance with yet another feature of the present invention, the auxiliary braking device may include an electromagnet and a metal pin. In the first state, the electromagnet may be actuated to attract the metal pin. A spring may be positioned between the electromagnet and the metal pin such that, in the second state, the electromagnet is not actuated and the metal pin is biased away from the electromagnet by the spring.

In accordance with still another feature of the present invention, the braking system may further include a spindle nut coupled to the electromotor, and the metal pin may include a friction head. During the second state, the friction head contacts the spindle nut to restrict rotation of the spindle nut.

In accordance with a further feature of the present invention, the electromotor may selectively drive the spindle nut with a force to overcome a contact friction of the friction head and overcome a locking of the at least one wheel brake.

In accordance with a still further feature of the present invention, the auxiliary braking device may be actuatable even after a failure of the braking system.

In accordance with a further feature of the present invention, the first state may applying a brake application force sufficient to lock the at least one wheel brake.

In accordance with yet another feature of the present invention, the auxiliary braking device may further include an electromagnetic friction slip coupling.

Further, in accordance with the features of the present invention, the auxiliary braking function can be effectively integrated fully into the electrical brake system. The extra expenditure in the electrical brake system may be slight and the safety of the electrical brake system is not reduced.

BRIEF DESCRIPTION OF THE DRAWING FIGURES

The present invention is further described in the detailed description which follows, in reference to the noted plurality of drawings by way of non-limiting examples of preferred embodiments of the present invention, in which like reference numerals represent similar parts throughout the several views of the drawings, and wherein:

FIG. 1 illustrates a schematic figure of an electrical brake system;

DETAILED DESCRIPTION OF THE PREFERRED EMBODIMENT

Figure 2A:
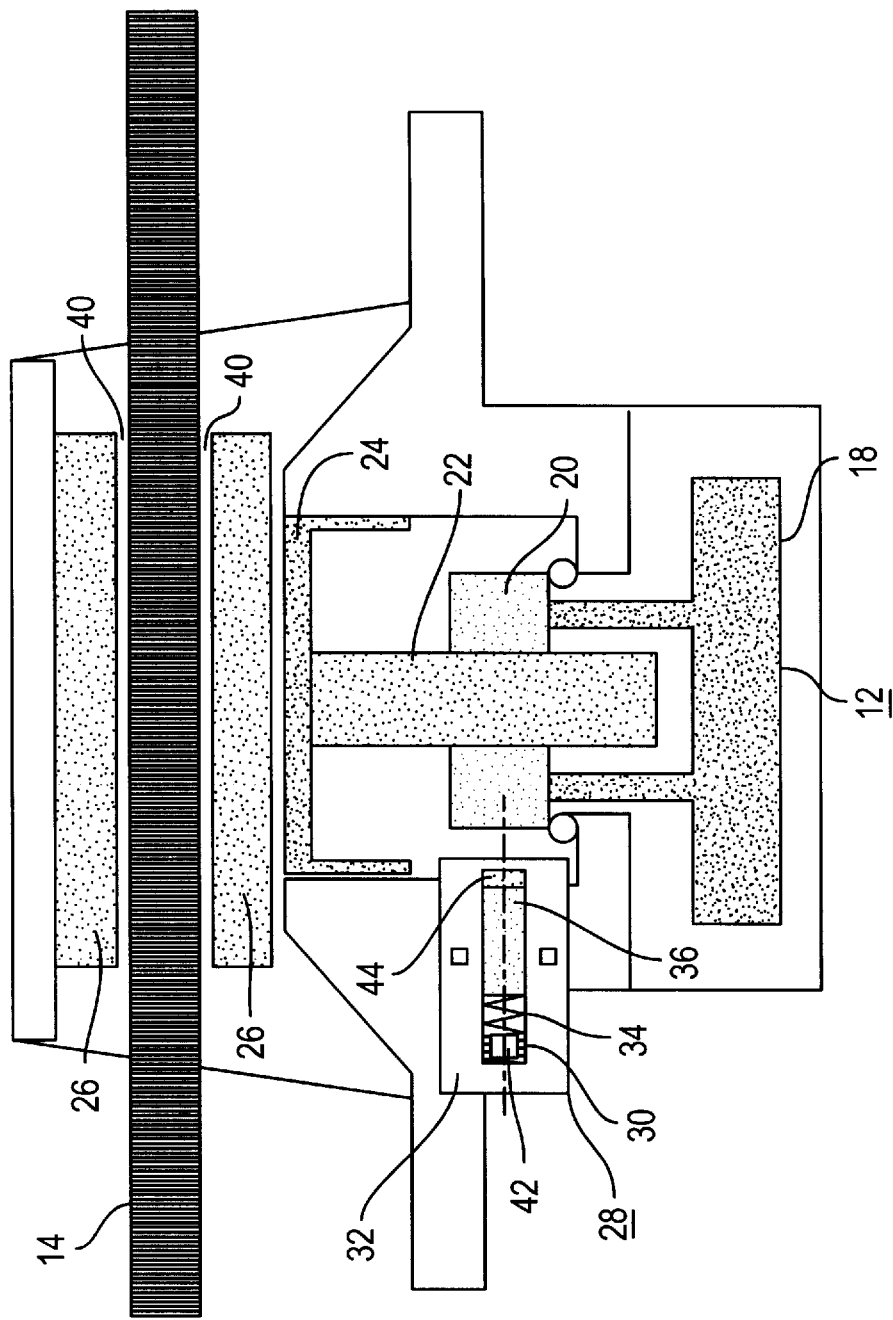
FIG. 2a illustrates a wheel brake with a released electrical auxiliary brake.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

FIG. 1 schematically illustrates an electrical braking system for a motor vehicle, however, only the components required for the descriptions below are represented. Foot pressure corresponding to a braking desire of the vehicle driver can be exerted on a brake pedal 2. As foot pressure increases, the movement of brake pedal 2 is correspondingly increased. The path (extent) traveled by brake pedal 2 may be converted, e.g., by a sensor 4 into an electrical signal corresponding to the driver's braking desire. The electrical signal may be sent through electrical lines 6a and 6b to electronic components 8a and 8b. Electrical components 8a and 8b may generate control signals from the received electrical brake signal and send control signals to which brakes 12a and 12b through electrical lines 10a and 10b, respectively. Wheel brakes 12a, 12b may be actuated in accordance with the control signals sent from electrical components 8a, 8b. Upon actuation, the brake linings contained within wheel brakes 12a, 12b may be pressed against brake disks 14a, 14b, respectively. Brake disks 14a, 14b may likewise place a braking force at the wheels 16a or 16b.

Figure 2B:
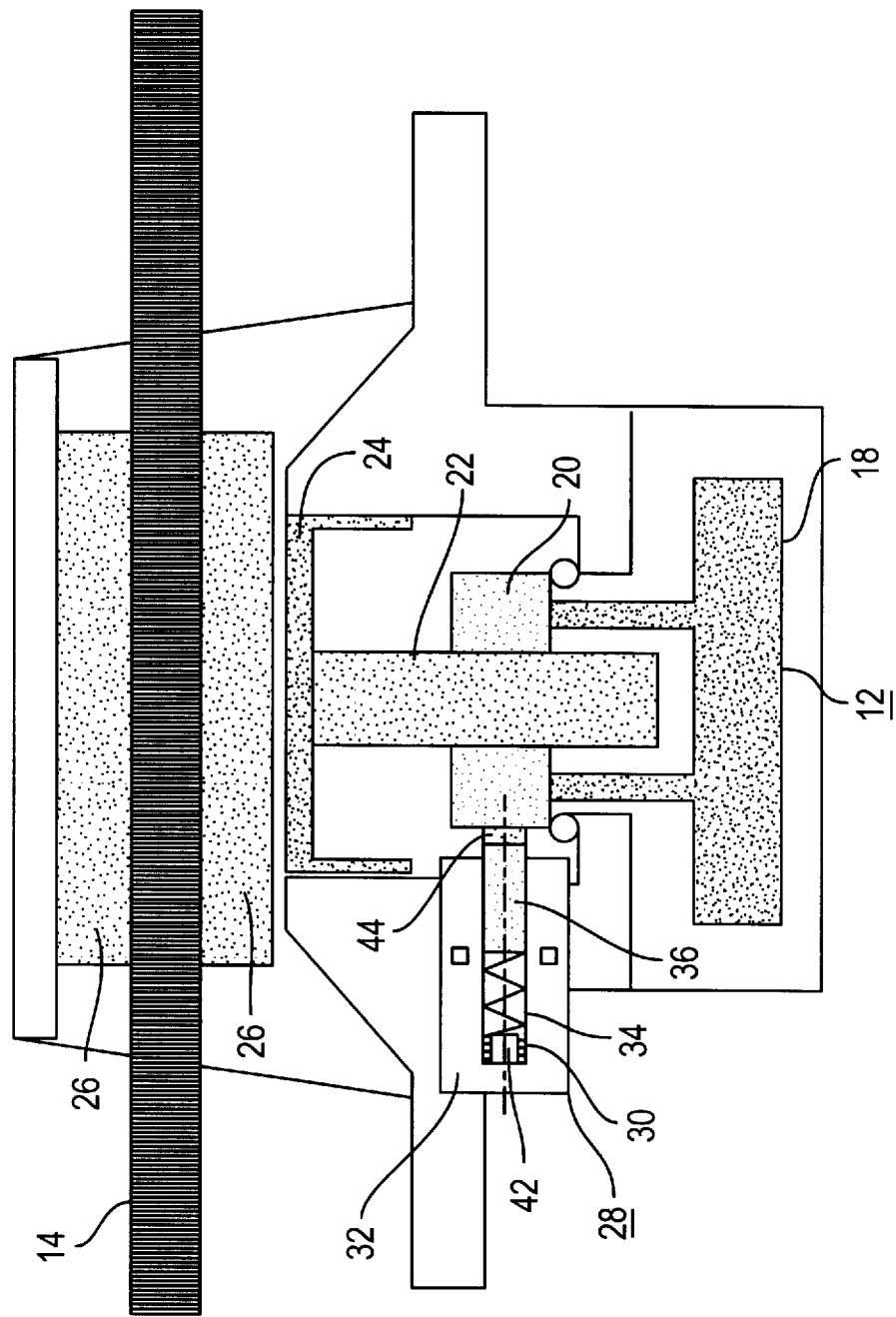
FIG. 2b illustrates a wheel brake with a set electrical auxiliary brake.

As illustrated, FIGS. 2a and 2b show an exemplary diagram of a preferred embodiment of the present invention. For example, wheel brake 12 may actuate a brake disk 14 and, further, wheel brake 12 may be locked by an electrical auxiliary brake 28. Wheel brake 12 may include an electromotor 18 that controls and sets a rotational movement of a spindle nut 20, an axis formed by a spindle 22. As rotational movement is imported to spindle nut 20, spindle 22 may be axially moved, which correspondingly imports axial movement on a brake piston 24. Thus, during braking, brake linings 26 may be operatively connected to piston 24 and, therefore, exhibit axial motion, through an air gap 40, toward a brake disk 14. As brake linings 26 contact brake disk 14, a braking force may be produced. The braking force may be a function of the brake application force exerted by spindle 22 upon brake piston 24 and, therefore, upon brake linings 26. After a braking event, brake linings 26, brake piston 24, and spindle 22 may be returned to their initial position by restoring forces. This retrograde (reverse) motion of the braking components may be possible due to an insignificant friction in wheel brake 12.

In accordance with the present invention, wheel brake 12 may include an electrical auxiliary brake 28 that may selectively lock wheel brake 12 and, therefore, brake disk 14. The electrical auxiliary brake 28 may be formed, e.g., by an electromagnetic friction slip coupling. An electromagnet may be disposed within a housing 32 of an electrical auxiliary brake 28. The electromagnet may be formed by a conductive coil 30 wound around a metal core 42. Electrical auxiliary brake 28 may include a metal pin 36 having a friction head 44. The metal pin 36 and friction head 44 may be supported to axially move within housing 32. A contact spring 34 may be disposed between the metal core 42 and the metal pin 36 to bias the metal pin 36 toward spindle nut 20.

FIG. 2a illustrates wheel brake 12 in a "released" state with respect to auxiliary brake 28. The "released" state of the electrical auxiliary brake 28 may be achieved by applying a predetermined electrical voltage to conductive coil 30, i.e., driving a predetermined current through conductive coil 30 to actuate the electromagnet. The electromagnet, upon actuation, pulls (or attracts) metal pin 26 into housing 32. Thus, to be in the "released" state, the spring force of contact spring 34 must be overcome. As shown in FIG. 2a, the "released" state of electrical auxiliary brake 28 does not hinder the free movement of spindle nut 20.

FIG. 2b shows wheel brake 12 in a "locked" or "self-locking" state. When in the "released" electrical auxiliary brake (FIG. 2a), wheel brake 12 may be actuated until brake linings 26 abut brake disk 14. While maintaining the "released" state, the electrical auxiliary brake 28 may be transferred from a first, current-carrying state, i.e., with respect to the electromagnet (FIG. 2a) into second, currentless, i.e., "set" state. In the currentless state, the electromagnet is disabled and metal pin 36 and friction head 44 may be pressed (or set) against spindle nut 20 by the force of contact spring 34. The contact pressure of metal pin 36 (friction head 44) against spindle nut 20 produces a friction force that is greater than a restoring force of either brake linings 26 or spindle 22. Thus, brake linings 26 may be fixed in position when electromotor 18 is not driven and, therefore, lock brake disk 14.

A friction force on spindle nut 20 generated by metal pin 36 may be selected so that the friction force may be overcome by actuation of electromotor 18. Thus, even when electrical auxiliary brake 28 is "set", i.e., extended from housing 32 by the force exerted by socket spring 34, electromotor 18 may impart movement of a spindle nut 20 (and spindle 22) that overcomes the contact force.

Figure 3:
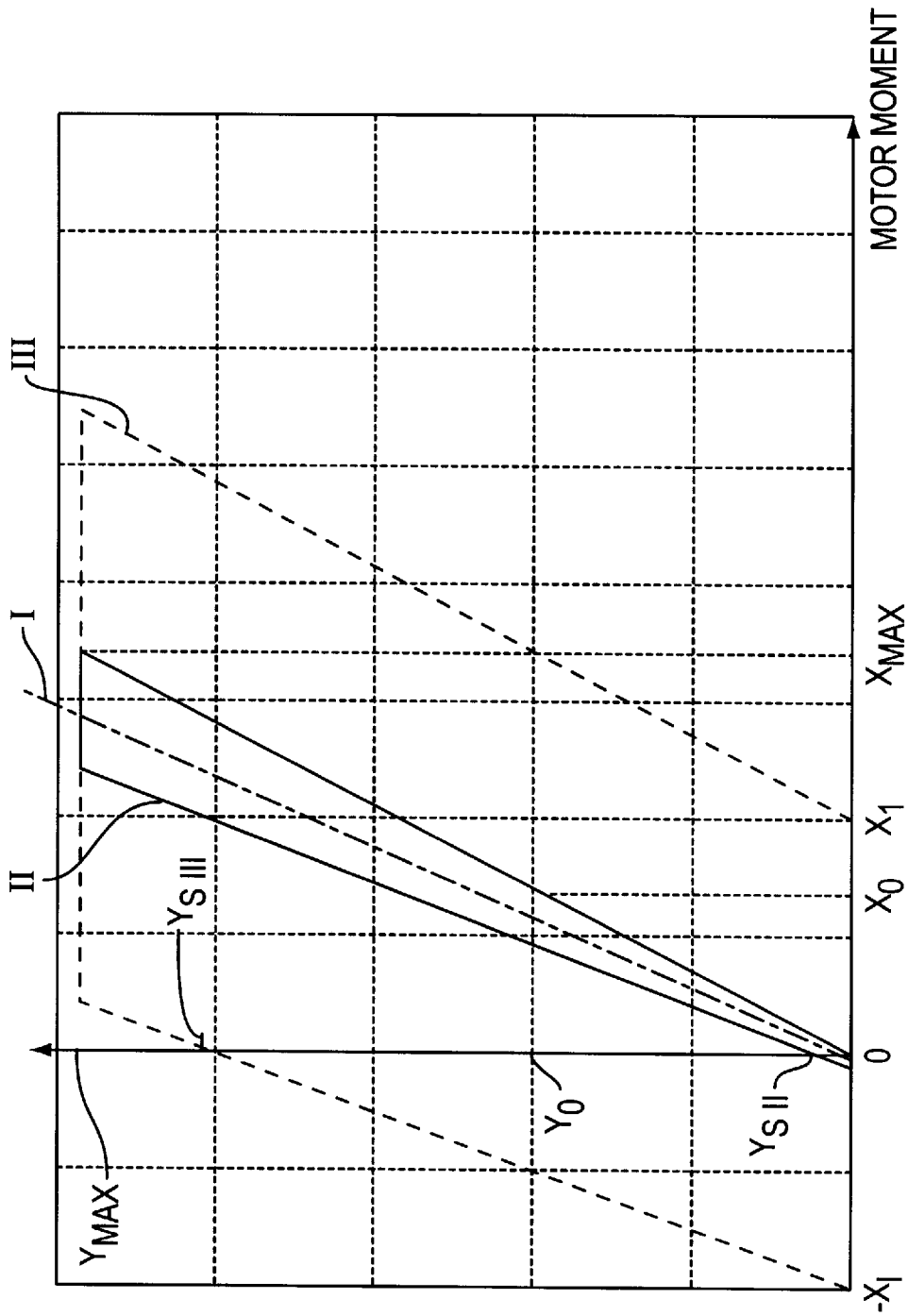
FIG. 3 illustrates a diagram of the interrelation between the set and released electric auxiliary brake.

FIG. 3 qualitatively illustrates the above-described interrelation between the electrical braking system and the auxiliary braking system. In the diagram of FIG. 3, a brake application force exerted on brake disk 14 (y-axis) may be plotted over a motor moment exerted by electromotor 18 (x-axis). A characteristic curve for an ideal wheel brake may be illustrated in the diagram as curve I (dot-dash line), an ideal wheel brake may be a wheel brake in which friction forces are equal to zero. In the ideal case, the application force disk brake 14 may be twice the motor movement of electromotor 18. As shown in curve I, as the motor moment increases by unit of one, the associated brake application force may increase by a unit of two. Conversely, as the motor moment is reduced (reversed) by a unit of one, the associated brake application force may be reduced by a unit of two.

FIG. 3 also illustrates a characteristic curve II (solid line) that describes conditions for an actual wheel brake having a slight internal friction when electrical auxiliary brake 28 is in the current-carrying state. During a braking procedure, electromotor 18 may exert, for example, a motor movement of $X_0$ that corresponds to a brake application force of $Y_0$ exerted on wheel brake 12. At the end of the braking procedure, i.e., when the motor moment is returning to zero, the brake application force may drop from the value $Y_0$ to a value $Y_{sII}$ (a value predetermined by an intersection point of characteristic curve II and the Y-axis). As shown in FIG. 3, brake application force value $Y_{sII}$ may be greater than zero. Because the characteristic curve II does not return to its starting position, this process may generally be referred to as a mechanical hysteresis. At brake application force $Y_{sII}$, i.e., the residual brake application force, the restoring force of wheel brake 12 may be in equilibrium with the internal friction force, i.e., a self-locking occurs with the brake application force $Y_{sII}$. A complete release of wheel brake 12, i.e., brake application force=0, is only possible by applying a negative motor moment to electromotor 18.

A characteristic curve III (dashed line), also illustrated in FIG. 3, may represent the conditions when electrical auxiliary brake 28 is in the currentless state and metal pin 36 (through friction head 44) is resting against spindle nut 20 (see FIG. 2b). Characteristic curve III may be considerably wider in relation to characteristic curve II due to the friction increase in wheel brake 12 and due to a self-locking occurring between brake application force values 0 and $Y_{sIII}$. Locking of a wheel may be better understood with reference to FIG. 3. It is initially noted that the wheel may be locked with a maximal brake application force predetermined by a value $Y_{sIII}$ (i.e., an intersection point of characteristic curve III and the Y-axis).

Further, in the current-carrying state of electrical auxiliary brake 28, i.e., characteristic curve II, a motor moment may be initially generated such that the produced brake application force may be greater than or equal to brake application force $Y_{sIII}$. While maintaining the initially generated motor moment, electrical auxiliary brake 28 may be transferred into its currentless state (i.e., characteristic curve III) so that friction in wheel brake 12 may be considerably increased with respect to the current-carrying state. The motor moment may then be returned to 0 and the correspondingly produced brake application force may drop to value $Y_{sIII}$. A further reduction below this value does not occur because, with brake application force $Y_{sIII}$, the restoring force of wheel brake 12 may be in equilibrium with the friction force exerted by electrical auxiliary brake 28 and, consequently, a self-locking of wheel brake 12 occurs.

Further, once the wheel is locked by a brake application force between 0 and $Y_{sIII}$, by placing electrical auxiliary brake 28 in the current carrying state, (i.e., characteristic curve II), a motor moment may be generated such that the produced brake application force may lie between 0 and $Y_{sIII}$. While maintaining the generated motor moment, electrical auxiliary brake 28 may be transferred into its currentless state (i.e., characteristic curve III) so that the friction in wheel brake 12 may increase with respect to the current-carrying state.

When the motor moment is returned to 0, the generated brake application force may be completely maintained, because in the above-mentioned region, the restoring force may be lower than the generated friction force of electrical auxiliary brake 28. Further, partial restoring of wheel brake 12 is not possible.

Finally, a functional failure of electrical auxiliary brake 28 may be explained with reference to FIG. 3. According to the discussion below, functional failure may be understood below as an uncontrolled transfer of auxiliary brake 28 into the currentless, "set" state and remaining in this state. Accordingly, because a purposeful transfer of electrical auxiliary brake 28 from the currentless state into the current-carrying state (or vice versa) is no longer possible only characteristic curve III is relevant to this discussion. If electrical auxiliary brake 28 fails, e.g., when a brake application force of 0 is exerted at a corresponding wheel, then, from characteristic curve III, the brake application force may remain equal to 0 as long as the motor moment is located between the values 0 and $X_1$. Thus, motor moment $X_1$ is required to overcome the friction force exerted. However, after the motor moment exceeds the amount $X_1$, a brake application force may be exerted on the corresponding wheel. To ensure that a brake application force can be exerted on the corresponding wheel, even in the event of a failed electrical auxiliary brake, the electromotor may be designed so that a maximal motor moment $X_{max}$ may be greater than motor moment $X_1$. Consequently, the moment range between $X_1$ and $X_{max}$ can be used for emergency braking when the electrical auxiliary brake has failed. The emergency braking function can be better exerted as the value $X_{max}$ more distinctly exceeds the value $X_1$.

Alternatively, in the event of a functional failure of electrical auxiliary brake 28 when brake application force $Y_{sIII}$ is exerted at the corresponding wheel, then, from characteristic curve III, the corresponding wheel may be released through imparting a negative motor moment, e.g., $-X_1$ (brake application force=0). Electromotor 18 of wheel brake 12 must therefore be designed so that a negative motor moment can be generated. It is noted that motor moments $-X_1$ and $X_1$ are equal since they are determined by means of the friction force generated by the electrical auxiliary brake 28.

The functional failure of the electrical auxiliary brake at the extreme values (i.e., brake application force=0 and brake application force=$Y_{sIII}$) has been explained. Thus, in the event of a functional failure of electrical auxiliary brake 28, if a brake application force lies between 0 and $Y_{sIII}$ at a corresponding wheel brake, then a release of the corresponding wheel is possible through the use of a motor moment that lies between 0 and $-X_1$.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

| Reference Numeral List | |
|---|---|
| 2 | brake pedal |
| 4 | sensor |
| 6a, b | electrical lines |
| 8a, b | electronic components |
| 10a, b | electrical lines |
| 12a, b | wheel brake |
| 14a, b | brake disk |
| 16a, b | wheels |
| 18 | electromotor |
| 20 | spindle nut |
| 22 | spindle |
| 24 | brake piston |
| 26 | brake lining |
| 28 | electrical auxiliary brake, e.g., an electrical friction slip coupling |
| 30 | coil |
| 32 | housing of the friction slip coupling |
| 34 | contact spring |
| 36 | metal pin with friction head |
| 40 | air gap |
| 42 | metal core |
| 44 | friction head |

What is claimed:

1. An electrical braking system for a motor vehicle comprising:

a brake pedal generating an electrical brake signal as a function of foot pressure;

a wheel brake for each wheel of the vehicle;

an electromotor associated with each wheel brake having a brake application device, and exerting a brake application force on each respective wheel brake that corresponds to the electrical brake signal;

an auxiliary braking device associated with at least one wheel of the motor vehicle;

the auxiliary braking device comprising an electrical auxiliary brake including a first, current-carrying state and a second, currentless state;

said first, current-carrying state permitting substantially uninterrupted movement of the brake application device, the second, currentless state increasing friction with the brake application device to actuate self-locking, the self-locking including a predetermined brake application force;

the electromotor actuated to overcome the self-locking.

2. The brake system for a motor vehicle according to claim 1, the electrical auxiliary brake comprising an electromagnetic friction slip coupling.

3. The brake system for a motor vehicle according to claim 1, further comprising a front axle having associated wheel brakes; the wheel brakes of a front axle comprising an electrical auxiliary brake.

4. The brake system for a motor vehicle according to claim 3, further comprising a rear axle having associated wheel brakes, the wheel brakes of the rear axle comprising an electrical auxiliary brake.

5. A process for locking an electrical brake system of a motor vehicle, the motor vehicle including a brake pedal generating an electrical brake signal as a function of foot pressure, a wheel brake for each wheel of the vehicle, an electromotor associated with each wheel brake having a brake application device, and exerting a brake application force on each respective wheel brake that corresponds to the electrical brake signal, an auxiliary braking device associated with at least one wheel of the motor vehicle, the auxiliary braking device comprising an electrical auxiliary brake including a first, current-carrying state and a second, currentless state, said first, current-carrying state permitting substantially uninterrupted movement of the brake application device, the second, currentless state increasing friction with the brake application device to actuate self-locking, the self-locking including a predetermined brake application force, and the electromotor actuated to overcome the self-locking, the process comprising:

positioning the electrical auxiliary brake in a first, current-carrying state;

applying a braking force on at least one wheel of the vehicle in generating a defined brake application force at the corresponding wheel brake; and transferring the electrical auxiliary brake to the second, currentless state; the second, currentless state exerting friction on the brake application device and generating a second brake application force; locking the at least one wheel.

6. The process for locking an electrical brake system for a motor vehicle according to claim 5, applying a brake force on the vehicle wheel to be locked comprises actuating the brake pedal.

7. A process for locking an electrical brake system for a motor vehicle according to claim 5, automatically transferring the electrical auxiliary brake into the second, currentlesss state when the vehicle motor is switched off.

8. The process according to claim 5, wherein the brake application device remains locked after returning the electrical auxiliary brake to the current carrying state.

9. The process according to claim 5, overcoming the locking of the at least one wheel by actuating the electromotor.

10. A braking system for a vehicle including a brake pedal and pressure sensor that monitors braking pressure applied to the brake pedal, said braking system comprising:

a wheel brake associated with each of a plurality of wheels of the vehicle;

an electromotor associated with each wheel brake applying a brake application force corresponding to the applied braking pressure; and an auxiliary braking device associated with at least one wheel brake comprising a first and second state, the first state enabling uninterrupted actuation of said at least one wheel brake and the second state, enabled after the first state, increasing friction within said at least one wheel brake to lock said at least one wheel brake.

11. The braking system according to claim 10, a driver that drives the electromotor to overcome the locking of said at least one wheel brake by said auxiliary braking device.

12. The braking system according to claim 11, said auxiliary braking device exhibiting a mechanical hysteresis with respect to said brake application force and rotation of said electromotor.

13. The braking system according to claim 10, said auxiliary braking device comprising an electromagnet and a metal pin, in said first state, said electromagnet is actuated to attract said metal pin; and a spring positioned between said electromagnet and said metal pin such that, in said second state, said electromagnet is not actuated and said metal pin is biased away from the electromagnet by said spring.

14. The braking system according to claim 13, said braking system further comprising a spindle nut coupled to said electromotor;

said metal pin comprising a friction head;

during said second state, said friction head contacts said spindle nut to restrict rotation of said spindle nut.

15. The braking system according to claim 14, said electromotor selectively driving said spindle nut with a force to overcome a contact friction of said friction head and overcome a locking of said at least one wheel brake.

16. The braking system according to claim 10, said auxiliary braking device actuatable even after a failure of the braking system.

17. The braking system according to claim 10, said first state applying a brake application force sufficient to lock said at least one wheel brake.

18. The braking system according to claim 10, said auxiliary braking device comprising an electromagnetic friction slip coupling.

* * * * *